United States Patent [19]

Wolfe et al.

[11] Patent Number: 5,271,180
[45] Date of Patent: Dec. 21, 1993

[54] SELECTIVE WAVELENGTH TRANSPARENT COVER FOR INSECT BAIT STATIONS

[75] Inventors: James G. Wolfe, Pleasanton; Lisa J. Brecher, Concord, both of Calif.

[73] Assignee: The Clorox Company, Oakland, Calif.

[21] Appl. No.: 928,855

[22] Filed: Aug. 11, 1992

[51] Int. Cl.$^5$ ............................................ A01M 25/00
[52] U.S. Cl. .................................................... 43/131
[58] Field of Search ........................................... 43/131

[56] References Cited

U.S. PATENT DOCUMENTS

| | | | |
|---|---|---|---|
| 2,837,861 | 6/1958 | Graham | 43/131 |
| 2,953,868 | 9/1960 | Chambers | 43/131 |
| 3,040,470 | 6/1962 | Kanin | 43/131 |
| 3,965,609 | 6/1976 | Jordan | 43/131 |

Primary Examiner—Kurt Rowan
Attorney, Agent, or Firm—Harry A. Pacini; Joel J. Hayashida; Michael J. Mazza

[57] ABSTRACT

An insect feeding station having a translucent cover of material having at least 50 percent selective wavelength transmittance of greater than about 600 nm to view the poison area and to increase insect feeding and not interfere with the feeding of nocturnal insects, particularly cockroaches, and a method for increasing insect feeding under lit conditions wherein said translucent cover is attached to a bait feeding station and placing said feeding station in the habitat of a feed insect.

9 Claims, No Drawings

SELECTIVE WAVELENGTH TRANSPARENT COVER FOR INSECT BAIT STATIONS

This invention relates to insect feeding stations having translucent covers. It more particularly relates to an insect feeding station whereby poison may be administered to insects without endangering humans or domestic animals and having means to safely view and inspect the station and bait therein. Means for accomplishing the inspection and at the same time maintain feeding conditions in the insect bait stations is described as a function of the wavelength of light transmitted by the transparent cover. This invention also relates to the method of increasing insect feeding on poison containing insecticidal bait in insect bait stations under lit conditions.

Various types of devices have been known in the prior art for destroying insects. In some devices, the insects are trapped in the device after entering, either by mechanical construction or by sticking to a gummy substance. In either instance, the device is soon full and useless. Other devices are used which contain a poison, such as poison bait, wherein the insect enters the device, consumes the poison bait and either dies within the interior of the device or leaves the device to die elsewhere. Many devices are known for holding a poisonous bait for control of crawling insects, ranging from simple cardboard tubes open at both ends with bait glued inside, to more elaborate structures that have a centrally enclosed bait accessible by peripheral openings. Furthermore, bait stations having transparent covers are well established in the prior art.

BACKGROUND OF THE INVENTION AND PRIOR ART

U.S. Pat. No. 4,563,836 (Woodruff et al., 1986) refers to an insect feeding station having a unitary base and optionally a partially or totally transparent cover. This patent teaches the use of a transparent cover in conjunction with a contrasting color base portion under the poison to make the poison contained in a central feeding area visible through the transparent cover.

U.S. Pat. No. 4,485,582 (Morris, 1984) relates to an insect feeding station having a base and transparent cover where the poison compartment has a contrasting luminous color under the poison to make removal of poison easily detectable, that is, the floor liner compartment of the poison compartment is coated with a contrasting colored layer before affixing the bait.

U.S. Pat. No. 4,894,947 (Brandli, 1990) relates to an insect feeding station having a central poison area, guide walls leading from the periphery of the station to the central poison area and a cover optionally having a transparent means to view the poison area. The transparency of the cover, or portion or section thereof, permits viewing of the poison compartment which has a contrasting luminous color under the poison to make detection of removal of the poison bait easily apparent.

U.S. Pat. No. 5,048,225 (Brandli, 1991) relates to an insect feeding station having a central poison area with a cover which is optionally transparent to view the poison area. The poison compartment may have a contrasting luminous color under the poison to make detection of the consumption of poison by the insects easily detectable through the transparent cover.

Such bait stations provide transparent covers for their respective bait stations that allow bait to be easily visible. In the prior art devices, the insects enter the bait stations containing the poison bait and actively feed therein consuming the bait. However, the prior art devices are generally of a construction that the material for the covers will present difficulties in viewing the interior so that it is not readily ascertainable whether insects remain in the device or how much of the poison bait has been consumed.

In other prior art devices, viewing of the insects and bait is through a transparent cover. However in the transparent covers of the prior art, the cover is transparent to light of all wavelengths. Unfortunately, the German cockroach [*Blattella germanica* (L.)] is a nocturnal or light-avoiding insect. Many insects, including the German cockroach in particular, are nocturnal feeders. German cockroaches will more readily feed in dark environments than in lit environments. German cockroaches have been observed to encounter food under lit conditions and to continue to seek dark shelter, rather than immediately consume the food that may be otherwise readily available. Feeding tests have indicated that German cockroaches use insect bait stations as harborages under general lighting conditions, returning to other harborages either when the station is disturbed or not under dark conditions. Bait stations have been found to contain dead cockroaches within the station, even though the active ingredient takes at least one day to kill the insect, because the cockroaches declined to leave the safety of the dark bait station when the exterior is under lit conditions.

It is reported by Koehler et al. in *Ann. Entomol. Soc. M.* 80:820–822 (1987) that the German cockroach has color vision, that is, the German cockroach sees light with its compound eyes, and receives light through ocelli and dermal photoreceptors as well. The German cockroach is a primary domestic cockroach pest species. Koehler et al. has determined the spectral sensitivity of the German cockroach compound eye and determined the influence on local motor activity.

The work of Koehler et al. also has shown significantly higher startle response activity under light of wavelengths of shorter than 600 nanometers (nm). In addition, it was shown that the German cockroach compound eye is not sensitive to light wavelengths greater than 600 nm.

It is now therefore an object of this invention to provide an insect feeding station with a transparent cover which will transmit light of wavelengths greater than 600 nm. Such transparent bait station covers will provide bait stations which will have significantly higher cockroach feeding under lighted conditions, than do bait stations with covers that transmit light at all wavelengths, including lower wavelengths.

It is an object of this invention to provide a translucent cover for an insect feeding station wherein the light transmitted therethrough is of selected wavelengths which will result in higher bait consumption and insect mortality over those bait stations having transparent covers.

It is an object of this invention to provide a method of increasing the feeding of nocturnal feeding insects under lit conditions by employing a bait station having attached thereto a cover of a material through which transmitted light is of selected wavelengths not perceptible to the insects.

It is yet a further object of this invention to provide a method of inspecting an insect feeding station without disturbing any insects therein by placing on the feeding station a cover made of material through which transmitted light is of selected wavelengths not perceptible to the insect.

A further object of the present invention is to provide an improved insect feeding station cover which will allow the bait to be inspected without reducing the effectiveness of the bait station for insect feeding.

Another object of the present invention is to provide an insect feeding station cover which will allow the bait to be inspected without reducing the attractiveness of the bait station for insect feeding.

A still further object of the present invention is to provide an insect feeding station cover which will be desirable for German cockroaches to seek refuge therein under lit conditions.

These and other objects of the invention will become apparent as the description thereof proceeds. The objects of this invention may be attained and the disadvantages of the prior art devices overcome by the use of the present invention.

The device of the present invention has a base portion for carrying the poison bait, and a transparent cover capable of transmitting discrete selected wavelengths of light not readily imperceptible to the German cockroach. The base portion generally has an outer case wall having a plurality of openings and a poison located therein, generally at the center of the case. The outer case may be of any configuration, e.g., round, square, rectangular, or other geometric design.

The base generally has inner walls leading from the outer openings to the poison bait and the walls are so positioned or shaped that a probe can not contact the poison bait if thrust into any of the outer wall openings and the walls generally direct or guide the insect to the center containing the poison bait. The cover of the device is permanently affixed to the base in a way to prevent access to the bait by children or pets. The poison is preferably of the type known as "bait", i.e., a mixture of slow acting poison and some food material attractive to insects. Such insect-attracting materials can be flour, molasses, peanut butter, oatmeal, carbohydrates such as fructose, fructose, glucose, maltose, or arabinose, yeast, starches such as corn starch, oils such as soyabean oil, canola oil or peanut oil, proteinaceous material such as silkworm pupae, fishmeal, bonemeal, and diary products such as cheese.

Thus, insects are attracted to the device or bait station, eat the bait and leave the device to die elsewhere. The bait may be mold-shaped, e.g., a flat wafer affixed to the floor of the inner compartment of the bait station. The preferred transparent bait station covers of the instant invention of specified light transmission properties is affixed to the base and optionally may have a downwardly projecting dimple positioning the lower end thereof in contact with a solid poison bait, thereby providing a means to secure the bait in place whether or not the bait is otherwise affixed to the floor of the inner compartment.

In another embodiment, a depression may be formed in the floor of the inner compartment and a paste-like bait or solid bait inserted therein, the floor of the base portion of the bait station being sloped upward from the outer edges thereof so that when the depression is formed, it does not extend below the plane of the outer edges of the floor. There is a still a further design, a solid bait may be inserted into a depression formed in the floor of the inner compartment and the transparent bait station cover of specified light transmission within the present invention can be formed with a downwardly projecting dimple such that the lower end thereof will contact the solid bait and secure the bait within the depression.

In another embodiment of the present invention, the transparent bait station cover of specified light transmission property is affixed to the base and has at least a section which is transparent at specified light wavelengths so that the poison is visible therethrough and at the same time the transmitted light is not readily imperceptible to the insect species therein. Alternatively, the entire cover may be of the same transparent material having the specified transmission properties of the specified wavelengths.

As an alternative feature in the embodiment of this invention, it may be desirable to coat the floor of the compartment with a contrasting color before inserting and applying or affixing thereto the bait within the bait station. Various colors may be desirable. Those which are luminous and readily visible in darkened areas would be most desirable.

As an alternative feature in the embodiment of this invention, the station cover and/or base may be composed of various materials, including but not limited to polystyrene, polyethylene, polyethylene terephthalate, polyvinyl chloride, polypropylene, or fiberglass.

As an additional alternative feature in the embodiment of this invention, the station may be sealed as through sonic welding of the cover to the base, heat sealing of the cover to the base, mechanically attaching the cover to the base through threaded components, snap lock fittings, chemically adhering the cover to the base, radio frequency sealing of the cover to the base, hinging the cover to the base, or otherwise encapsulating and sealing the bait in a translucent material.

Bait station effectiveness is a function of how much bait remains in the station. In general, commercial cockroach bait station products achieve three months of control due to the amount of bait in each station. In heavier infestations, bait can be completely consumed before an infestation has been controlled, thereby the applicator would not be aware that additional bait is required. As a result, remaining insects repopulate a habitation and poor product efficiency and effectiveness is observed. Use of a transparent bait station cover of specified light transmission properties at preferred wavelengths can assist the applicator in determining that the insects have fully consumed the bait and that additional applications are required prior to the repopulation of the habitation before complete insect control is achieved. Therefore, this development provides the advantage of bait inspection while minimizing feeding deterrences among German cockroaches under lighted conditions.

Bait stations with covers that transmit light of wavelengths greater than 600 nm have significantly higher cockroach feeding than do stations with covers that transmit light of lower wavelengths. The following experiment shows German cockroach feeding is a function of the type of light allowed to pass through the lid under continuous lighting. The results show that only the high wavelength light (medium red) station and the solid (black) station showed significantly higher feeding from that observed for the lower wavelength bait stations.

In this experiment, 5 grams of mixed stages of German cockroaches were released into an arena containing the five different stations. Each station was fitted with a different color cover, ranging from black, medium red, grey, clear and yellow. Each station contained bait without active ingredient. Each arena also contained water and a harborage that was placed equidistant from the test baits. The test was replicated 7 times, and all arenas were constantly exposed to light for the duration of the test.

TABLE I

| Variable | Cover Color | | | | |
| --- | --- | --- | --- | --- | --- |
| | Black | Medium Red | Grey | Clear | Yellow |
| Bait consumption mg/day | 32.190a | 27.540a | 22.754b | 21.865b | 20.103b |
| Peak Wavelength (nm) | — | 670–710 | 380–500 | 290–800 | 500–660 |
| Light Transmission (%) | 0 | 4 | 25 | 100 | 92 |

Table 1 - Mean bait consumption (mg) per day vs cover color
Values followed by the same letter cannot be shown to be significantly different.

Table II shows the results of testing with additional bait station colored cover designs ranging from black, fire, medium red, light red and blue. The test summarized in Table II used 5 grams of mixed stages of German cockroaches with continuous light exposure in a plastic arena of 16"×10"×6.5" dimensions. Alternative food and water were placed adjacent to a dark harborage. One station of each color was placed in the arena; all stations were placed at the same distance from the dark harborage. The test was replicated 7 times (8 tests total), with the positions of the different colored stations randomly selected relative to the other station colors. This approach was used to ensure that, for example, the fire color cover samples were not always placed adjacent to the blue color cover sample.

TABLE II

| Variable | Cover Color | | | | |
| --- | --- | --- | --- | --- | --- |
| | Black | Fire | Medium Red | Light Red | Blue |
| Bait consumption mg/day | 41.619a | 35.976ab | 32.655bc | 33.597bc | 29.997c |
| Peak Wavelength (nm) | — | 670–700 | 670–710 | 640–720 | 410–490 |
| Light Transmission (%) | 0 | 20 | 4 | 12 | 18 |

Table 1 - Mean bait consumption (mg) per day vs cover color
Values followed by the same letter cannot be shown to be significantly different.

In summary, all of the cover colors of fire, medium red and light red were significant in allowing bait to be viewed with a light source without disturbing the German cockroaches feeding therein. From these data, it is clear that the peak wavelength of transmitted light and not the percent transmission of light (above 0% transmission) affected cockroach feeding.

The present invention provides an improved insect feeding station having a transparent bait station cover that transmits more than 50% of its light in a wavelength longer than 600 nanometers (nm). Ideally, the transparent cover only transmits light wavelengths longer than 600 nm. More specifically, bait feeding station covers that transmit light wavelengths longer than 640 nm have been shown to provide significantly higher cockroach feeding than do stations that transmit light wavelengths shorter than 600 nm.

It will be seen that the present invention provides an improved insect feeding station having a transparent bait station cover of specified light transmission properties of specified wavelengths to enhance the visual observation of insect feeding station interiors without disturbing a feeding insect by sudden illumination wherein the translucent cover for the insect feeding station has a wavelength transmission of from about 600 to about 750 nm, thereby allowing visual detection of bait in the bait station in dimly lit areas were a light source is necessary to view the contents of the bait stations without removing the bait station, which bait station has guide means to direct insects to the poison containing bait.

It will be seen that the present invention provides an insect feeding station for administering poison to insects, particularly German cockroaches, wherein the bait station contains a translucent cover which transmits light of a wavelength not sensitive to cockroach visual receptors, but transparent to visual inspection by humans for detection of bait consumption and insects remaining in the bait station without removing the device or dismantling the device. Preferred embodiments of the insect bait station and cover have been described, and it will be understood by those skilled in the art that the present invention may be modified in both arrangement and detail. Therefore, scope of protection afforded the invention should only be limited in accordance with the scope of the following claims.

What is claimed is:

1. An insect feeding station for administering poison containing bait to insects comprising a base portion and a cover, said base portion comprising a floor with a substantially centered feeding area and poison bait located in said feeding area, an outer wall having at least one opening, and inner walls spaced apart from said outer wall and extending perpendicularly upward from said base portion and being offset in vertical plane from said outer wall opening from said floor to said cover, said cover formed of a transparent material having at least 50 percent selective wavelength transmittance of greater than about 600 nm.

2. The feeding station described in claim 1 in which said insects are cockroaches.

3. The feeding station described in claim 1 wherein said base portion and said cover are made of transparent material having at least 50 percent selective wavelength transmittance of greater than about 600 nm.

4. The feeding station described in claim 1 wherein said base portion and said cover are made of transparent material having at least 50 percent selective wavelength transmittance of from about 620 to about 700 nm.

5. The feeding station described in claim 1 wherein said feeding station is formed from a unitary piece.

6. The feeding station described in claim 1 wherein said feeding station is formed of assembled parts and securely sealed together.

7. A method of increasing insect feeding under lit conditions employing a bait station by attaching to said bait station a transparent cover of material having at least 50 percent selective wavelength transmittance greater than about 600 nm and placing said insect feeding station in the habitat of a feeding insect.

8. The method of claim 7 wherein said insects are cockroaches.

9. The method of claim 7 wherein said transparent cover material has a peak wavelength transmittance of at least 50 percent from about 620 to about 700 nm.

* * * * *